(12) United States Patent
Lin et al.

(10) Patent No.: US 7,830,078 B2
(45) Date of Patent: Nov. 9, 2010

(54) FIELD EMISSION BACKLIGHT MODULE AND COLOR DISPLAY DEVICE HAVING THE SAME

(75) Inventors: Yi-Ping Lin, Hsinchu (TW); Shih-Pu Chen, Hsinchu (TW); Jung-Yu Li, Hsinchu (TW); Wei-Chih Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 678 days.

(21) Appl. No.: 11/417,053

(22) Filed: May 4, 2006

(65) Prior Publication Data

US 2007/0114913 A1 May 24, 2007

(30) Foreign Application Priority Data

Nov. 18, 2005 (TW) .............................. 94140650 A

(51) Int. Cl.
*H01J 9/04* (2006.01)
*H01J 63/04* (2006.01)
*H01J 1/62* (2006.01)

(52) U.S. Cl. .................. 313/495; 313/310; 313/496; 313/498; 445/50; 445/51

(58) Field of Classification Search ................. 313/494
See application file for complete search history.

(56) References Cited

U.S. PATENT DOCUMENTS 5,170,092 A * 12/1992 Tomii et al. ................. 313/310
6,250,984 B1 * 6/2001 Jin et al. ....................... 445/51
6,445,122 B1 * 9/2002 Chuang et al. .............. 313/495
6,639,632 B2 * 10/2003 Cheng et al. .................. 349/12
7,598,665 B2 * 10/2009 Li et al. ....................... 313/495
2004/0245910 A1 * 12/2004 Tang et al. .................. 313/483
2005/0062390 A1 * 3/2005 Takeuchi et al. ............ 313/310

* cited by examiner

*Primary Examiner*—Sikha Roy
*Assistant Examiner*—Tracie Green
(74) *Attorney, Agent, or Firm*—Birch, Stewart, Kolasch & Birch, LLP

(57) ABSTRACT

A field emission backlight module has a field emission structure with cathode and anode provided on the same plane, so that electrons directly penetrate an independently provided fluorescent powder layer to produce light. The light is emitted uniformly without the need of the conventional optical membrane. Since the light produced by the fluorescent powder layer is not blocked by the anode, the problem of charge accumulation on the fluorescent powder layer is avoided, and it is not necessary to use expensive light-transmittable conducting glass as the anode. With the cathode and the anode located at the same plane, it is not necessary to use a precision spacer to adjust the distance between the cathode and the anode, enabling the module to be manufactured at reduced cost and high good yield. When the color sequential displaying method is adopted, expensive color filters required in the conventional LCD may be omitted.

38 Claims, 7 Drawing Sheets

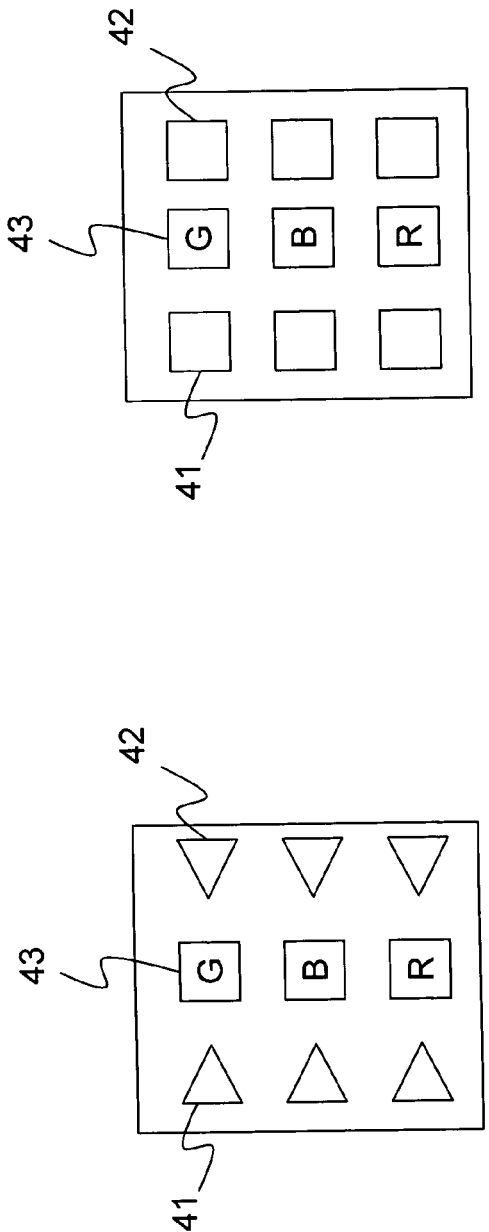
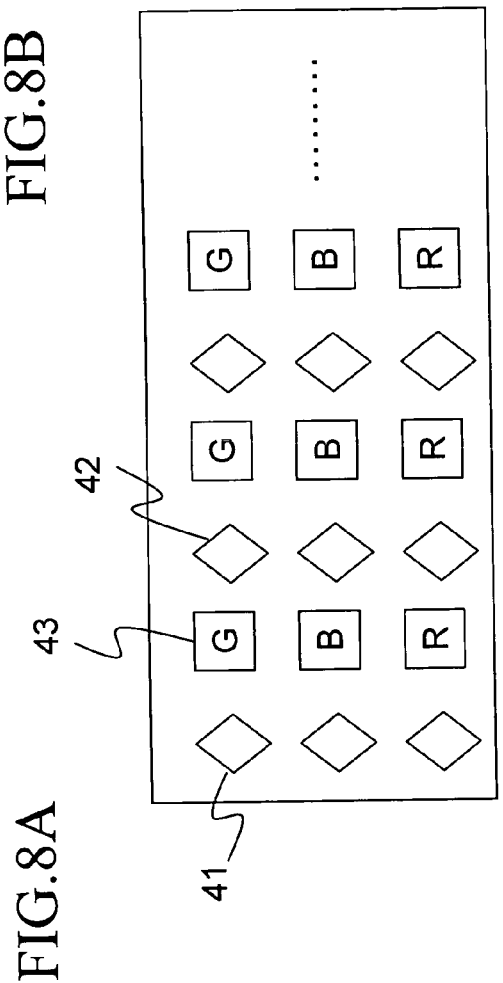
FIG.8A
FIG.8B
FIG.8C

FIELD EMISSION BACKLIGHT MODULE AND COLOR DISPLAY DEVICE HAVING THE SAME

FIELD OF THE INVENTION

The present invention relates to a field emission backlight module for liquid crystal displays, and more particularly to a field emission backlight module, in which field emission electrons penetrate the fluorescent powder to produce light.

BACKGROUND OF THE INVENTION

The manufacturing of field emission display (FED) based on the principle of field emission has been positively researched and developed since the field emission electron property was found. Meanwhile, since the liquid crystal display (LCD) has the advantageous slim and planar structure, the application of the field emission display to the backlight module for the LCD is also widely developed. The field emission display (FED) is superior to the conventional cold cathode fluorescence lamp (CCFL) for LCD in many aspects, including the brightness, response speed, range of vision, etc. Generally speaking, the field emission display is very suitable for use as a backlight module. However, the conventional field emission display is hindered from being commercialized within a short time by several tough problems in the manufacturing process thereof.

FIG. 1 is a conceptual diagram of a conventional vertical type field emission backlight module, which includes a cathode 20 having a field emitter 21, on which a carbon nano material is grown and an array of spindles is formed; an anode 10 that is an indium tin oxide (ITO) glass coated with a layer of fluorescent powder 11, and a gate 22 provided closed to a top of the cathode 20. Due to a high field between the cathode 20 and the anode 10, the field emission electrons are emitted from the field emitter 21 of the cathode 20 in a vacuum space enclosed in the module, and impact the fluorescent powder 11 on the anode 10 for the fluorescent powder 11 to produce light. The gate 22 is connected to a relatively small positive electricity, so as to attract the cathode to increase the electron emissivity.

The above-described conventional vertical type field emission backlight module is prevented from commercializing due to the following disadvantages: (1) It requires a spacer 12 to control a vertical distance between the cathode 20 and the anode 10; (2) since the allowable tolerance for the module is very small, considerations in structural design and good yield must be taken when the module is applied to a large area; moreover, it is also very difficult to control the evenness of an overall brightness when the module is applied to a large area; (3) in the event the carbon nano material is not evenly grown on the field emitter 21 at the cathode 20, there would be some areas on the cathode 20 that do not have emitted electrons, resulting in dark spots on the fluorescent powder 11; (4) since the light from the fluorescent powder 11 would be blocked by the anode 10, the anode 10 must be an expensive light-transmittable conducting glass made of indium tin oxide; (5) the gate 22 also requires additional manufacturing cost; and (6) the emitted electron beam tends to be out-of-focus and results in a low contrast image.

SUMMARY OF THE INVENTION

A primary object of the present invention is to provide a field emission backlight module that adopts a horizontal type field emission light emitting structure for the field emission electrons to directly penetrate the independently distributed fluorescent powder to produce light, so that the problems of bottleneck and high cost in manufacturing the conventional field emission backlight module are solved.

Another object of the present invention is to provide a field emission backlight module that may cooperate with an LCD panel to form a LCD that displays image using the color sequential method, so as to omit the expensive color filters used in the conventional LCD.

To achieve the above and other objects, the field emission backlight module according to the present invention is designed for applying to an LCD having an LCD panel, and includes a substrate, a plurality of light-emitting units, and a glass substrate. The light-emitting units are arranged on the substrate in array, and each includes a cathode, an anode, and a fluorescent powder layer, all of which are provided on a top of the substrate with the cathode and the anode located at two opposite sides of the fluorescent powder layer. With the electric field formed between the cathode and the anode, the electrons at the cathode are excited to directly penetrate the fluorescent powder layer for the same to produce light. The emitted electrons are then attracted by the anode. The glass substrate is located above the light-emitting units to locate behind the LCD panel, so that light emitted from the fluorescent powder layer diverges toward the LCD panel.

Since the fluorescent powder layer is not in contact with the cathode and the anode, and the electrons penetrated the fluorescent powder layer are not blocked by the anode, the problem of charge accumulation on the fluorescent powder layer can be avoided and the light produced by the fluorescent powder layer is not blocked by the anode, either. Therefore, it is not necessary to use the expensive ITO glass or use a spacer to space the cathode from the anode, and the manufacturing cost of the backlight module can be reduced.

In the present invention, it is possible to grow a carbon nano material, a conducting oxide, a metal structure, a nitride, or arrayed spindles on the cathode or the anode to serve as a cathodic field emitter or an anodic field emitter, allowing further increase of surface field at the cathode and reduction of operating voltage thereof. The light emitted from the light-emitting units depends on the type of the fluorescent powder layer used. The light-emitting units may be differently arrayed and driven in different manners, so that the field emission backlight module of the present invention may be used in different applications.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIGS. 8A, 8B, and 8C are conceptual diagrams showing some examples of different arrays of the cathode, anode, and fluorescent powder layer in the field emission backlight module of the present invention.

DETAILED DESCRIPTION OF THE PREFERRED EMBODIMENTS

Figure 1:
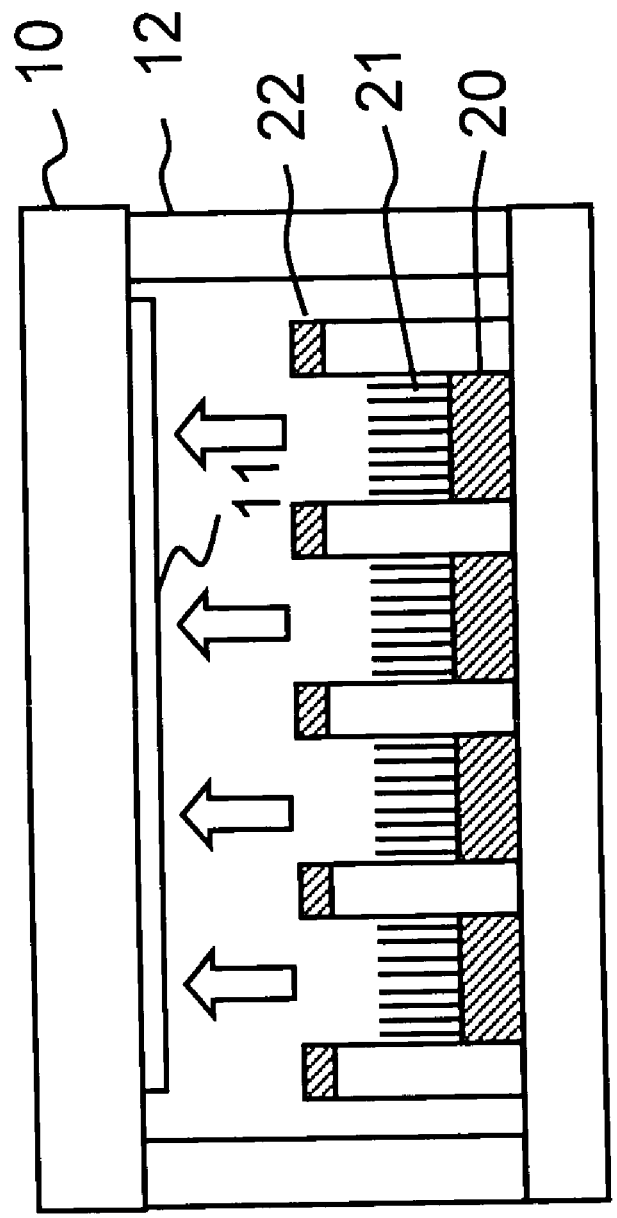
FIG. 1 is a conceptual diagram of a conventional vertical type field emission backlight module.
Figure 2:
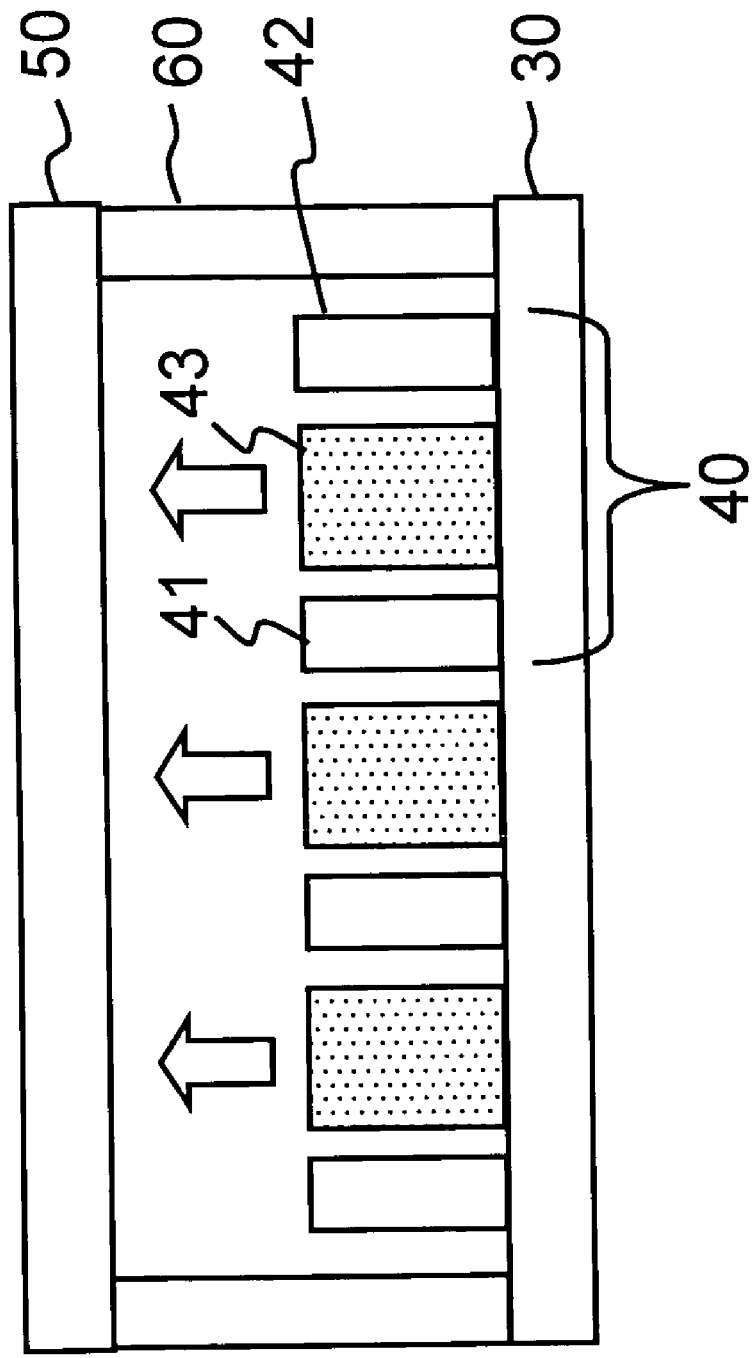
FIG. 2 is a conceptual diagram of a field emission backlight module according to a preferred embodiment of the present invention.

Please refer to FIG. 2 that is a conceptual diagram of a field emission backlight module according to a preferred embodiment of the present invention. The field emission backlight module of the present invention is designed for mounting behind an LCD panel of an LCD, and includes a substrate 30, a plurality of light-emitting units 40, and a glass substrate 50. In the illustrated preferred embodiment, the substrate 30 and the glass substrate 50 are spaced from each other using spacers 60, and together define a vacuum space between them to enclose the light-emitting units 40 therein. The light-emitting units 40 are arranged in array, and each includes a cathode 41, an anode 42, and a fluorescent powder layer 43, all of which are provided on an upper surface of the substrate 30. The cathode 41 and the anode 42 are located at two opposite sides of the fluorescent powder layer 43. Since the fluorescent powder layer 43 is not in contact with the cathode 41 and the anode 42, the problem of charge accumulation on the fluorescent powder layer 43 can be avoided. When the electric field produced between the cathode 41 and the anode 42 induces electrons to release from the surface of the cathode 41, the released electrons move in a direction substantially parallel to the surface of the substrate 30 to directly penetrate the fluorescent powder layer 43, so that the fluorescent powder layer 43 is excited to produce light. The electrons are then attracted by the anode 42. And, the light produced by the fluorescent powder layer 43 penetrates through the glass substrate 50 to diverge toward the LCD panel.

The spacers 60 used in the illustrated embodiment of the present invention are designed according to actual requirements. For example, the spacers 60 may have a size and quantity depending on an area of the LCD panel. Moreover, the light emission performance of the present invention is independent of the size of the spacers 60.

In the illustrated embodiment, either the cathode 41 or the anode 42 is formed of a carbon nano material, so as to produce a high field and induce field emission electrons to obtain a low turn-on field and operating voltage. Alternatively, the cathode 41 or the anode 42 may be made of other materials capable of enhancing the field emission property, such as a conducting oxide, a metal structure, a nitride, or an array of spindles, to achieve the same good effect. Wherein, the carbon nano material may be selected from the group consisting of carbon nanotubes, carbon nanowalls, and diamond-like films (i.e, diamond-like carbon). Zinc oxide (ZnO) is one of the oxides capable of enhancing the field emission property. Molybdenum (Mo), tungsten (W), or silicon (Si) may be selected as the metal structure to enhance the field emission property. And, gallium nitride (GaN) or boron nitride (BN) may be selected as the nitride to enhance the field emission property.

Figure 3:
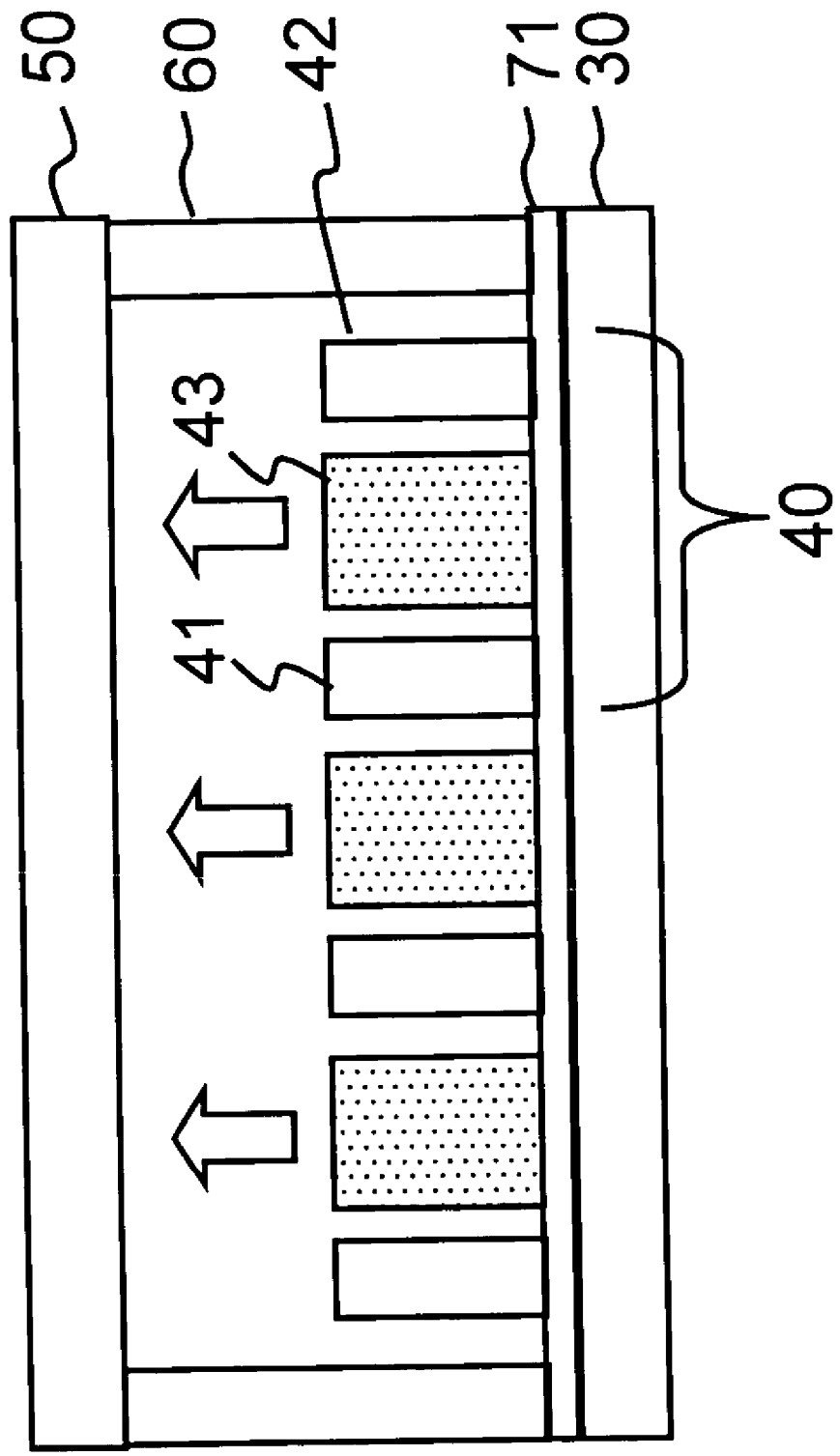
FIG. 3 is a conceptual diagram of a field emission backlight module having an insulating layer according to another embodiment of the present invention.

In the illustrated embodiment of the present invention, the substrate 30 may be made of a highly insulating material, such as glass, ceramic, plastics, or Teflon. In another embodiment of the present invention as shown in FIG. 3, the substrate 30 may be a silicon substrate or a metal substrate plated with an insulating layer 71, so that the substrate 30 is insulated from the cathode 41 and the anode 42.

Figure 4:
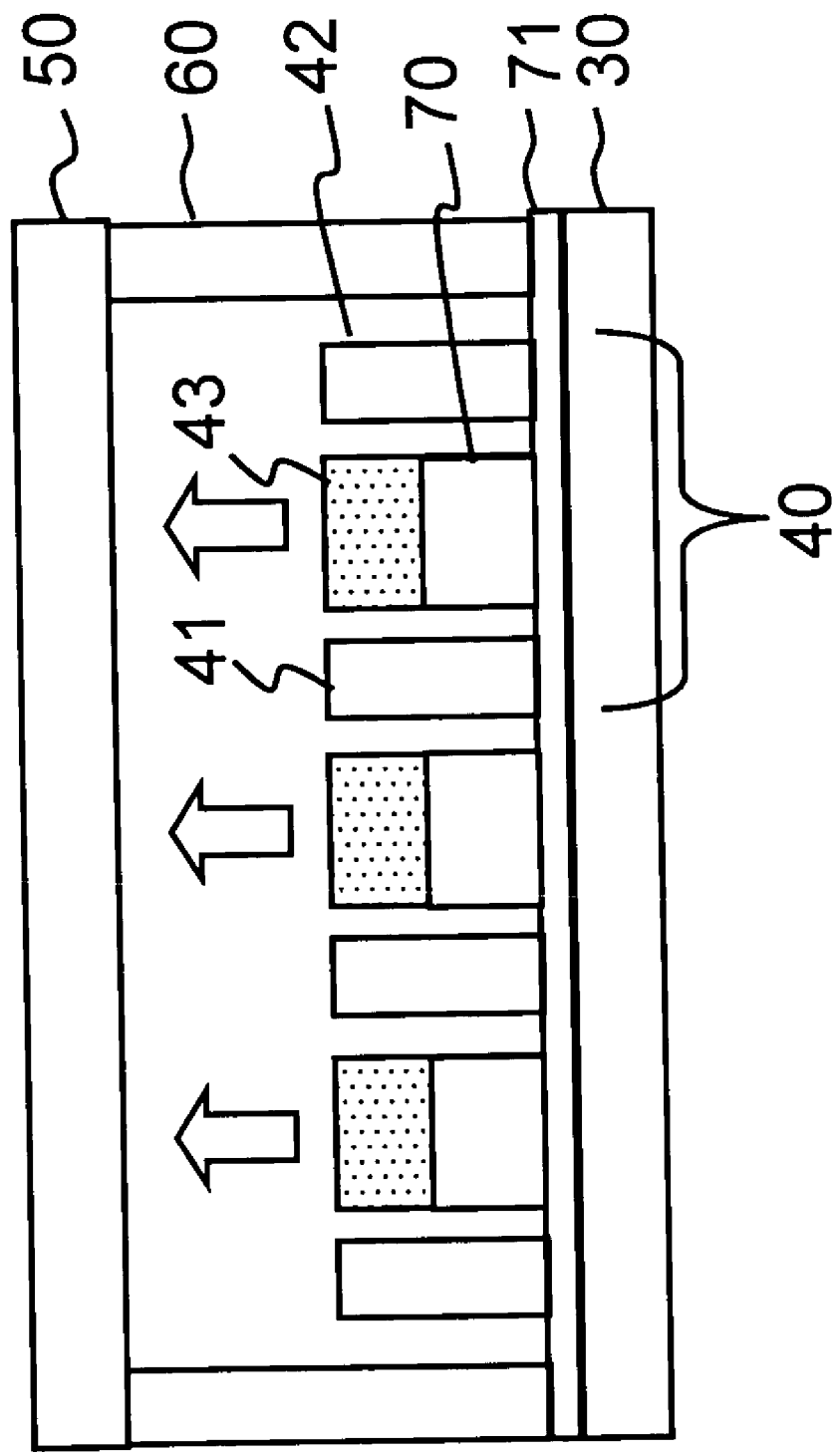
FIG. 4 is a conceptual diagram of a field emission backlight module having a metal reflection layer according to a further embodiment of the present invention.

In a further embodiment of the present invention shown in FIG. 4, a metal reflection layer 70 may be provided on the upper surface of the substrate 30 and behind the fluorescent powder layer 43 to remove the phenomenon of light resonance and increase the brightness and lighting efficiency. The metal reflection layer 70 must be isolated from the cathode 41 and the anode 42, and may serve as a grounding layer to eliminate charge accumulation on the fluorescent powder layer 43. The invention further comprising a conductive layer formed on the upper surface of said substrate below said cathode 41 and said anode 42.

Light emitted from the light-emitting unit 40 has a wavelength dependent upon the type of the fluorescent powder layer used. And, the light-emitting units 40 may be differently arrayed for different applications.

Figure 6:
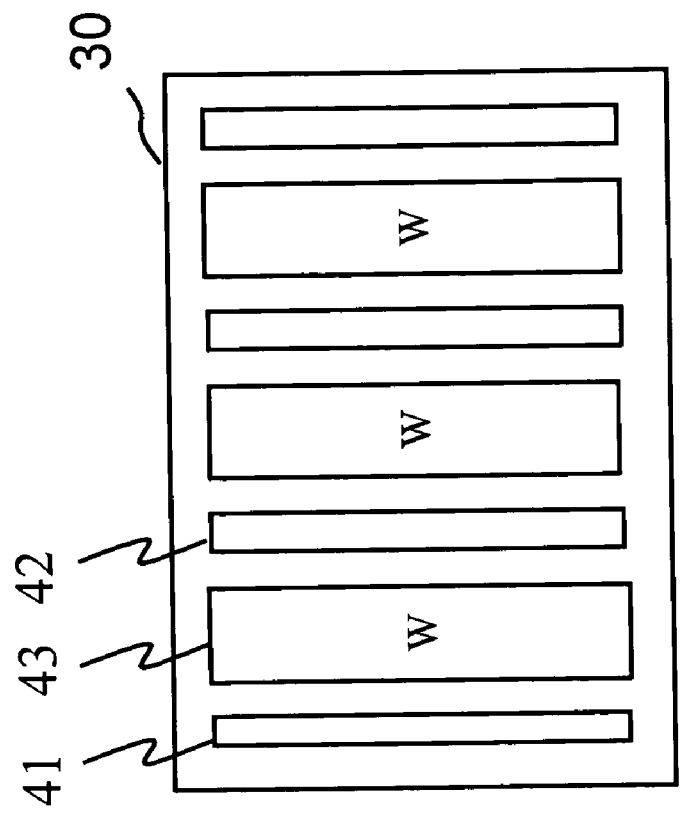
FIGS. 5 and 6 are conceptual diagrams showing two different arrays of the cathode, anode, and fluorescent powder layer in the field emission backlight module of the present invention to form differently arrayed image point light sources.
Figure 5:
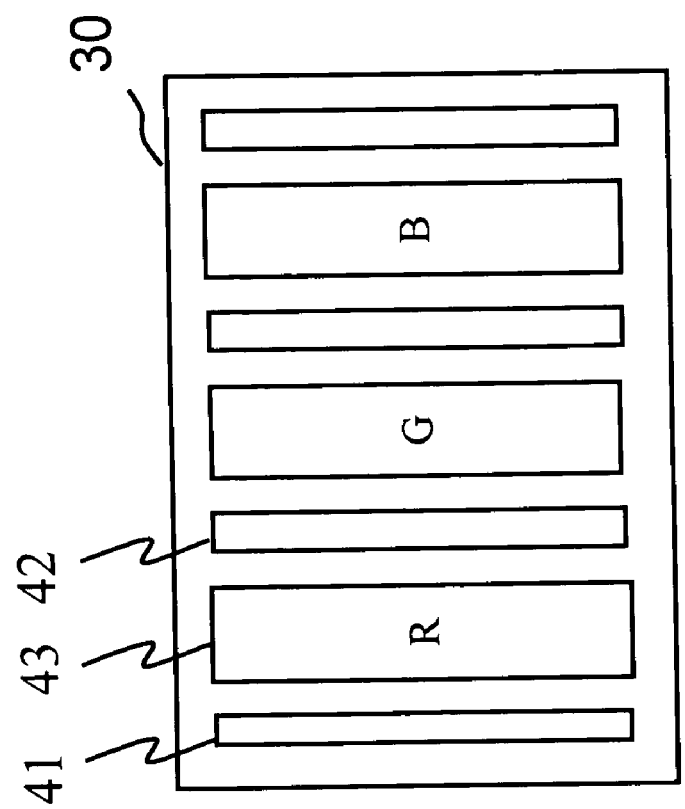
Figure 7:
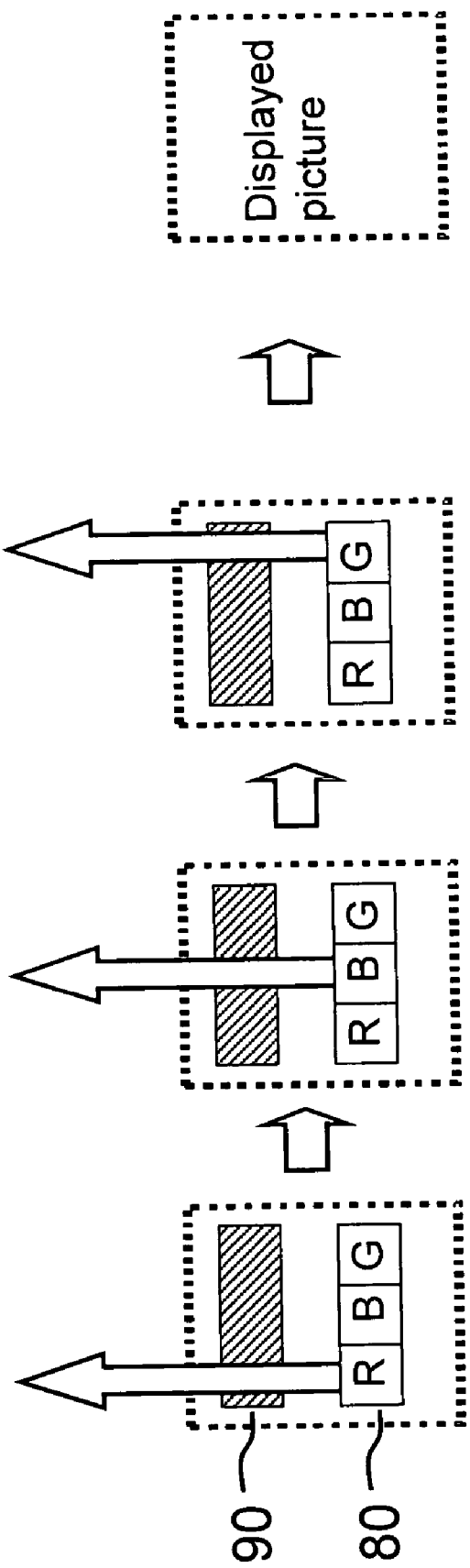
FIG. 7 is a conceptual diagram showing the time-dependent liquid crystal pictorial image formed in the color sequential display method adopted by the present invention.

FIG. 5 shows a first array of the cathode 41, the anode 42, and fluorescent powder layers 43 separately containing red (R), green (G), or blue (B) fluorescent powder for separately producing R, G, or B image point light source. The cathode 41 and anode 42 for the respective R, G, and B colors may be controlled by independent circuits. The produced R, G, B light may be mixed to produce different color systems. As shown in FIG. 6, it is also possible to directly use premixed fluorescent powder, for example, white fluorescent powder, in the fluorescent powder layer 43 to produce light having a desired color. Moreover, as can be seen from FIGS. 8A, 8B, and 8C, the cathode 41 and the anode 42 may be designed to show different shapes, such as the triangular shape shown in FIG. 8A, the square shape as shown in FIG. 8B, or the diamond shape as shown in FIG. 8C, and be continuously arranged to form the field emission backlight module.

In the conventional liquid crystal image displaying principle, a white backlight module is used along with RGB color filters to display color images. The color filters are extremely expensive. To overcome this high cost problem, the present invention adopts the color sequential displaying method, in which a field emission backlight module 80 using three primary colors RGB to produce light is associated with a ferroelectric LCD panel 90 driven by a thin film transistor (TFT). With this method, the color filters needed in the conventional LCD are omitted to reduce the manufacturing cost of the LCD, and it is more easily for the LCD to achieve high precision because it is not necessary to split the pixel into three subpixels.

Briefly speaking, the present invention provides a field emission backlight module having a horizontal structure. Namely, the cathode, the anode, and the fluorescent powder layer of the light-emitting units 40 are grown on the same plane. Since the fluorescent powder layer does not contact with the cathode and the anode, light produced by the fluorescent powder layer is not blocked by the anode, eliminating the problems of charge accumulation on the fluorescent powder layer and high cost for an anode made of indium tin oxide glass.

In the present invention, since the electron penetrated through the fluorescent powder layer is not blocked by the anode, every electron is able to emit a linear light in its moving direction. Therefore, more light beams may be effectively emitted to reduce the dark spots and largely increase the light emission uniformity. As a result, the present invention is able to replace the currently widely employed liquid crystal backlight module using the cold cathode-ray tube, and saves the costs for optical membranes, such as light guide panel and diffuser.

Moreover, with the vacuum sealing in the present invention, the ITO glass may be replaced with a general transparent glass to achieve the same purpose of vacuum insulation, and it is not necessary to use precise a spacer to separate the cathode from the anode. Besides, it is known that the field emission performance is sensitive to the distance between the cathode and the anode, and a nano-scale precision for this purpose must be maintained. However, in the present invention, the horizontal distance between the cathode and the anode can be precisely controlled by way of screen printing or optical lithography at largely reduced cost. The field emission backlight module of the present invention needs only general spacer that has no relation with the light emission performance and further reduces the cost of the present invention.

With the color sequential displaying method adopted in the present invention, the field emission backlight module enabling R, G, B light emission is associated with a ferroelectric liquid crystal panel driven by a thin film transistor to omit the expensive color filters needed in the conventional LCD and effectively enhance the precision of the displayed image.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A field emission backlight module applied in a liquid crystal display (LCD), said LCD including an LCD panel, and said field emission backlight module comprising:
    a substrate;
    a plurality of light-emitting units arranged on an upper surface of said substrate in array, and each of said light-emitting units including:
        a fluorescent powder layer provided on the upper surface of said substrate;
        a cathode provided on the upper surface of said substrate adjacent to one side of said fluorescent powder layer; and
        an anode provided on the upper surface of said substrate adjacent to another side of said fluorescent powder layer opposite to said cathode, so that electrons at said cathode are excited to directly penetrate from only a parallel direction said fluorescent powder layer to produce light, said electrons are then attracted by said anode, and
    a glass substrate provided above said light-emitting units to locate behind said LCD panel, such that light produced by said fluorescent powder layer diverges toward said LCD panel,
    wherein said substrate is made of an insulating material and said fluorescent powder layer is not in contact with said cathode and said anode.

2. The field emission backlight module as claimed in claim 1, further comprising a spacer disposed between said glass substrate and said substrate; said spacer, said glass substrate, and said substrate together defining a vacuum space to enclose said light-emitting units therein.

3. The field emission backlight module as claimed in claim 1, wherein said insulating material is selected from the group consisting of glass, ceramic, plastics, and Teflon.

4. The field emission backlight module as claimed in claim 1, wherein said substrate is selected from the group consisting of silicon substrate and metal substrate.

5. The field emission backlight module as claimed in claim 4, further comprising an insulating layer formed on the upper surface of said substrate below said cathode and said anode.

6. The field emission backlight module as claimed in claim 1, further comprising a conductive layer formed on the upper surface of said substrate below said cathode and said anode.

7. The field emission backlight module as claimed in claim 1, further comprising a metal reflection layer formed on the upper surface of said substrate below said fluorescent powder layer.

8. The field emission backlight module as claimed in claim 1, wherein said fluorescent powder layer is selected from the group consisting of red (R), green (G), and blue (B) fluorescent powder.

9. The field emission backlight module as claimed in claim 1, wherein said fluorescent powder layer comprises white fluorescent powder obtained by mixing R, G, and B fluorescent powder.

10. The field emission backlight module as claimed in claim 1, wherein said cathode is selected from the group consisting of carbon nano material, conducting oxide, metal structure, nitride, and arrayed spindles.

11. The field emission backlight module as claimed in claim 10, wherein said carbon nano material is selected from the group consisting of carbon nanotube, carbon nanowall, and diamond-like carbon.

12. The field emission backlight module as claimed in claim 10, wherein said oxide is zinc oxide (ZnO).

13. The field emission backlight module as claimed in claim 10, wherein said metal structure is selected from the group consisting of molybdenum (Mo), tungsten (W), and silicon (Si).

14. The field emission backlight module as claimed in claim 10, wherein said nitride is selected from the group consisting of gallium nitride (GaN) and boron nitride (BN).

15. The field emission backlight module as claimed in claim 1, wherein said anode is selected from the group consisting of carbon nano material, conducting oxide, metal structure, nitride, and arrayed spindles.

16. The field emission backlight module as claimed in claim 15, wherein said carbon nano material is selected from the group consisting of carbon nanotube, carbon nanowall, and diamond-like carbon.

17. The field emission backlight module as claimed in claim 15, wherein said oxide is zinc oxide (ZnO).

18. The field emission backlight module as claimed in claim 15, wherein said metal structure is selected from the group consisting of molybdenum (Mo), tungsten (W), and silicon (Si).

19. The field emission backlight module as claimed in claim 15, wherein said nitride is selected from the group consisting of gallium nitride (GaN) and boron nitride (BN).

20. A color display device with color sequential type field emission backlight module, comprising:
    an LCD panel; and
    a field emission backlight module consisting of:
        a substrate;
        a plurality of light-emitting units arranged on an upper surface of said substrate, and each of said light-emitting units including:
            a fluorescent powder layer provided on the upper surface of said substrate and including red (R), green (G), and blue (B) fluorescent powder;
            a cathode provided on the upper surface of said substrate adjacent to one side of said fluorescent powder layer; and
            an anode provided on the upper surface of said substrate adjacent to another side of said fluorescent powder layer opposite to said cathode, so that electrons at said cathode are excited to directly penetrate from only a parallel direction said fluorescent powder layer to produce light, said electrons are then attracted by said anode; and a glass substrate provided above said light-emitting units to locate behind said LCD panel, such that light produced by said fluorescent powder layer diverges toward said LCD panel, wherein said substrate is made of an insulating material and said fluorescent powder layer is not in contact with said cathode and said anode.

21. The color display device with color sequential type field emission backlight module as claimed in claim 20, further comprising a spacer disposed between said glass substrate and said substrate; said spacer, said glass substrate, and said substrate together defining a vacuum space to enclose said light-emitting units therein.

22. The color display device with color sequential type field emission backlight module as claimed in claim 20, wherein said insulating material is selected from the group consisting of glass, ceramic, plastics, and Teflon.

23. The color display device with color sequential type field emission backlight module as claimed in claim 20, wherein said substrate is selected from the group consisting of silicon substrate and metal substrate.

24. The color display device with color sequential type field emission backlight module as claimed in claim 23, further comprising an insulating layer formed on the upper surface of said substrate below said cathode and said anode.

25. The color display device with color sequential type field emission backlight module as claimed in claim 20, further comprising a conductive layer formed on the upper surface of said substrate below said cathode and said anode.

26. The color display device with color sequential type field emission backlight module as claimed in claim 20, further comprising a metal reflection layer formed on the upper surface of said substrate below said fluorescent powder layer.

27. The color display device with color sequential type field emission backlight module as claimed in claim 20, wherein said cathode is selected from the group consisting of carbon nano material, conducting oxide, metal structure, nitride, and arrayed spindles.

28. The color display device with color sequential type field emission backlight module as claimed in claim 27, wherein said carbon nano material is selected from the group consisting of carbon nanotube, carbon nanowall, and diamond-like carbon.

29. The color display device with color sequential type field emission backlight module as claimed in claim 27, wherein said oxide is zinc oxide (ZnO).

30. The color display device with color sequential type field emission backlight module as claimed in claim 27, wherein said metal structure is selected from the group consisting of molybdenum (Mo), tungsten (W), and silicon (Si).

31. The color display device with color sequential type field emission backlight module as claimed in claim 27, wherein said nitride is selected from the group consisting of gallium nitride (GaN) and boron nitride (BN).

32. The color display device with color sequential type field emission backlight module as claimed in claim 20, wherein said anode is selected from the group consisting of carbon nano material, conducting oxide, metal structure, nitride, and arrayed spindles.

33. The color display device with color sequential type field emission backlight module as claimed in claim 32, wherein said carbon nano material is selected from the group consisting of carbon nanotube, carbon nanowall, and diamond-like carbon.

34. The color display device with color sequential type field emission backlight module as claimed in claim 32, wherein said oxide is zinc oxide (ZnO).

35. The color display device with color sequential type field emission backlight module as claimed in claim 32, wherein said metal structure is selected from the group consisting of molybdenum (Mo), tungsten (W), and silicon (Si).

36. The color display device with color sequential type field emission backlight module as claimed in claim 32, wherein said nitride is selected from the group consisting of gallium nitride (GaN) and boron nitride (BN).

37. The field emission backlight module as claimed in claim 1, wherein said electrons penetrate said fluorescent powder layer in a direction generally parallel to the surface of said substrate.

38. The color display device with color sequential type field emission backlight module as claimed in claim 20, wherein said electrons penetrate said fluorescent powder layer in a direction generally parallel to the surface of said substrate.

* * * * *